Dec. 12, 1967    SVEN ÅKE EKSTRÖM    3,358,211
CONVERTER CONTROL WITH COMPENSATION OF DISTURBANCES
IN THE COMMUTATION VOLTAGES
Filed Nov. 30, 1964
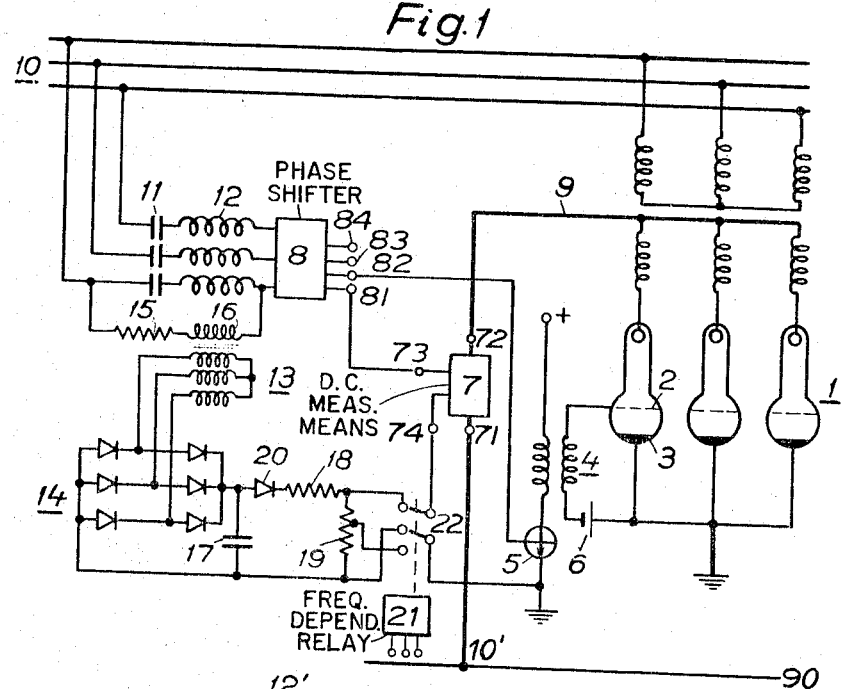
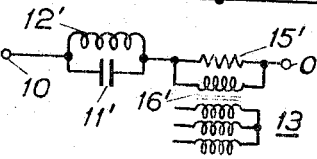
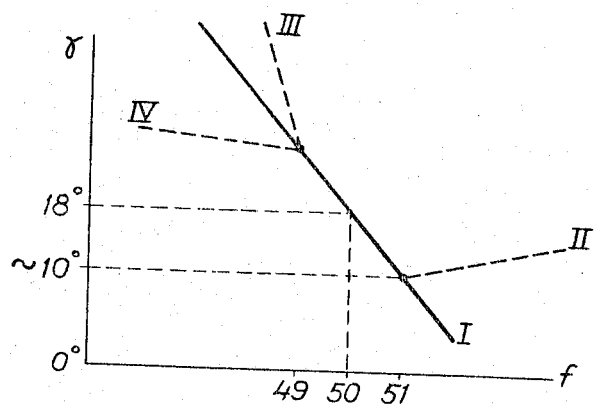
INVENTOR.
SVEN ÅKE EKSTRÖM
BY Bailey, Stephen &
Huttig United States Patent Office 3,358,211
Patented Dec. 12, 1967

3,358,211
CONVERTER CONTROL WITH COMPENSATION OF DISTURBANCES IN THE COMMUTATION VOLTAGES
Sven Åke Ekström, Solna, Sweden, assignor to Allmänna Svenska Elektriska Aktiebolaget, Vasteras, Sweden, a corporation of Sweden
Filed Nov. 30, 1964, Ser. No. 414,707
Claims priority, application Sweden, Dec. 9, 1963, 13,615/63
8 Claims. (Cl. 321—35)

ABSTRACT OF THE DISCLOSURE

Control means for a static inverter connecting a direct current network to an alternating current network; said control means comprising means of a kind known per se for securing a certain margin of commutation for the rectifiers of the inverter independent of variations in the direct current of the inverter and in the amplitude of the voltage of the A.C. network; said control means comprising further means for securing said commutation margin independent of variations in the frequency and of transients in the voltage of said A.C. network; said further means comprising filter means which pass said abnormal voltage variations and rectifying means for transferring the abnormal voltages into a direct current signal fed to the first means.

---

The present invention relates to a control means for static converters of the type which is intended to secure a certain desirable margin of commutation during inverter operation, and the invention relates to such a control means which, depending on the commutation voltages and the load current of the converter, produces pulses for introducing commutations between the different rectifiers in the converter.

During inverter operation of a converter, each commutation between two rectifiers must be ended a certain time before the commutation voltage for the two rectifiers has become zero, in order to make sure that the rectifier being extinguished is not re-ignited when said commutation voltage changes polarity. A control means for this purpose is, for example, necessary in the inverter station in a power transmission system with high voltage direct current if this station is controlled with regard to a certain predetermined margin of commutation. The invention is suitable for any form of control means where a certain predetermined margin of commutation is secured by producing ignition pulses for the rectifiers of the converter from the commutation voltage and load current of the converter. Such a control means can be formed as a so-called consecutive control means, for example according to U.S. Patent No. 2,774,012, comprising a means for determining at each moment the time integral of the commutation voltage in question from said moment to the desired moment for the end of the commutation, and a means for measuring the load current of the converter. Further, the consecutive control means contains a comparing means, which delivers pulses for initiating the commutation at the moment when said time integral and the load current of the converter are in a certain relation to each other. When building up such a consecutive control means it is practical and in most cases also permissible to assume that the commutation voltage is sinusoidal. By choosing said ratio between said time integral and load current in such a way that the margin of commutation does not become too small, it has been shown that such a control means also functions satisfactorily during small deviations from the sinusoidal form of the commutation voltage.

In connection with faults and/or switchings, the sinusoidal commutation voltage can however be superimposed with harmonics, which can cause faulty calculation of said time integral and thereby a possible reduced margin of commutation and in unfavourable cases re-ignition of the extinguishing rectifier may occur. Similar phenomena occur upon alternations in the frequency of the commutation voltage. During transient changes in the commutation voltage it has also been found that the control means can calculate a faulty ignition moment depending on the time constants in inlet filters and phase shifting circuits. Such possibilities of fault calculation occur everywhere where control pulses are produced from the commutation voltage. In order to avoid this, the margin of commutation preset in the control means may be increased, but this involves an increase in the reactive power required by the converter and also in the wear on the rectifiers, which is a disadvantage.

The invention relates to a method of temporarily increasing the margin of commutation, upon large deviations from a sinusoidal commutation voltage and upon large frequency deviations from the nominal frequency, and the principle of the invention is to produce an additional magnitude upon such deviations, which additional magnitude is added to the signal which gives the load current of the converter, so that the conventional control means interprets the incoming signals as if the load current of the converter were greater than it actually is. In this way the ignition pulses for the different rectifiers are given earlier than would be the case if said additional magnitude according to the invention did not exist. Consequently, the invention allows the margin of commutation of the converter to be reduced in normal operation without risk of re-ignition so that the reactive power required by the converter is reduced.

A control means according to the invention is characterised by a device influenced by the commutation voltages of the converter and tuned with reference to this, and arranged to give a signal upon deviation of the commutation voltages from sinusoidal form and/or normal frequency, which signal in a suitable way is added to the signal which represents the load current of the converter. Said device can suitably consist of resonance filters, series or parallel filters, tuned for the normal frequency of the commutation voltage, to which resonance filters transformers are connected, whose secondary sides deliver the desired output signals. In order to eliminate smaller disturbances in the commutation voltages it is known to insert a resonance filter in the connection of the commutation voltage to the conventional control means. When such a resonance filter exists, it is suitable to connect the transformers according to the invention over this filter. Further, it is suitable to rectify the output voltage from the transformers when the signal which gives the load current is a direct voltage or current.

As mentioned, smaller disturbances in the commutation voltage can be eliminated with a resonance filter. The device according to the invention therefore is suitably made ineffective within a certain area with smaller disturbances and only effective when the disturbances exceed a certain value, for example when the frequency change exceeds a few percent or more. For this reason it is proposed to provide the device with a means for determining a certain threshhold value. If the secondary sides of the transformers are connected to a rectifier connection, said means can suitably consist of a diode of some kind with a certain potential drop in the conducting direction.

Regarding the variation under varying frequencies of the margin of commutation, it can be said that the margin of commutation with a constant control angle increases with decreasing frequency and decreases with increasing frequency. This depends partly on the commutation time being mainly independent of the frequency. With decreasing frequency, therefore, the relative commutation time is shortened, so that the margin of commutation with a constant control angle is lengthened. At the same time the device according to the invention accelerates the initiation of the commutation, which gives a further increase of the margin of commutation. Above all however the change in the margin of commutation caused by a frequency change depends on a phase shifting in the devices which generate the control voltage and both these changes in the commutation margin usually co-operate so that the margin of commutation becomes very sensitive to frequency changes. An increase in the margin of commutation with decreasing frequency is however unnecessary, and it is therefore proposed to provide the device with a frequency sensitive relay, which with decreasing frequency disconnects the device according to the invention. Another possibility is to provide said relay with a two-way contact for reversal of polarity of the signal from the device. In this way it becomes possible according to the invention to eliminate the increase in the margin of commutation with decreasing frequency.

The invention will otherwise be more fully described with reference to the accompanying drawing, where FIGURE 1 shows a control means with series resonance filters according to the invention. FIGURE 2 shows parallel resonance filters for a similar device and FIGURE 3 shows variation of the margin of commutation in relation to the frequency.

FIG. 1 shows a inverter 1 with three mercury arc rectifiers 101, 102, 103 and control means for one of these. The inverter connects a D.C. network 90 to an A.C. network 10 for supplying said A.C. network with power from the D.C. network. Each rectifier is provided with control grid 2 and cathode 3 connected to the secondary side of a grid voltage transformer 4. The primary side of this grid voltage transformer is connected to a D.C. supply in series with a transistor 5. Two devices 7 and 8 are connected to the control electrode of this transistor, of which the device 7 is arranged to measure the load current in the D.C. main conductor 9 of the converter and the device 7 can therefore suitably be arranged as some form of D.C. measuring means, for instance a measuring transducer, with input terminals 71, 72 connected to the D.C. main conductor 9 and output terminals 73, 74, connected to a control circuit of the transistor 5. The device 8 which is connected to the network 10 is arranged to produce a magnitude for each rectifier from the A.C. voltages connected to the converter. This can be done in the way that, from the commutation voltage between each two commutation rectifiers, the time integral of the commutation volage is produced from every moment up to the desired moment for the termination of the commutation in question. The signal coming from the device 7 is thus common for all the rectifiers in the converter, while the device 8 for each rectifier must deliver an output signal corresponding to the time integral of the commutation voltage between the rectifier in question and the preceding rectifier in the commutation sequence. When the sum of the series connected voltages from the devices 7 and 8 becomes positive, the transistor 5 becomes conducting and a current flows through the primary winding in the transformer 4, which thereby gives an ignition pulse to the grid in the rectifier. By suitable dimensioning and building up the devices 7 and 8, it is possible with varying load current and commutation voltage in the converter to give a signal for ignition of the different rectifiers at such moments that each commutation is terminated within a reasonable time before the zero passage of the commutation voltage, so that with the device described it is possible to operate a converter with a certain desired commutation margin as described in the above mentioned U.S. Patent No. 2,774,012.

More specifically, it may be said that if the current of the inverter is commutating from rectifier 103 to 101 these two rectifiers together with their transformer windings form a closed commutation circuit in which a commutation current is arising owing to the commutation voltage in the circuit, which voltage is the difference between the proper two phase voltages of the transformer. When the commutation current which is opposite to the load current of the extinguishing rectifier 103 is equal to said load current, the rectifier 103 is currentless so that the commutation is accomplished.

From this it is seen that the commutation time is substantially proportional to the load current of the inverter and is dependent on the commutation voltage in such a way that the commutation time is inversely proportional to the time integral of the commutation voltage during the commutation time. Thus it is seen that with increasing load current of the inverter the commutation must be initiated earlier if a certain commutation margin is required while with increasing commutation voltage the begnning of the commutation can be delayed without losing the desired commutation margin.

Assuming that the commutating voltage is sinusoidal, the device 8 can be constructed simply as a phase shifting apparatus, which shifts the commutation voltage 90°, since the time integral of a sinusoidal voltage is a cosinusoidal voltage with reference to the same phase angle. As earlier mentioned, this has been proved practical and completely sufficient if the devices 7 and 8 are only set with reference to a reasonably large margin of commutation. Thus the apparatus 8 suitably is formed as a phase shifter, the input side of which is connected to the A.C. network 10 while its output side is provided with four terminals 81–84 of which the terminal 81 is a common neutral connected to the D.C. measuring device 7 common to all the rectifiers while the terminals 82–84 are phase terminals each connected to the control electrode of the corresponding transistor 5 for the proper rectifier of the inverter. Thus it is seen that the output of the phase shifter 8 and the output of the D.C. measuring means 7 together with the contact 22, described later, form a closed control circuit for the transistor 5.

During normal operation the commutation voltage can usually be reckoned as fairly sinusoidal. In connection with faults and change-overs however the commutation voltage can be superimposed with harmonics which the control apparatus is not able to take into account and which can exert such an influence that it is not possible for the control apparatus to give its ignition pulse at such a moment that a fault free commutation can be carried out. The result can be decreased margin of commutation and in unfavourable cases re-ignition of the extinguished valves. In the worst case the commutation will quite simply not be accomplished. Other transient changes of the commutation voltage can also cause the control means to calculate an incorrect ignition moment and this is also the case with frequency deviations from the normal frequency of the network.

In order to safeguard against such disturbances, according to the invention a signal is added to the signal which represents the load current of the converter, which additional signal only appears when the commutation voltage deviates considerably from its normal condition and which causes the control means to get a summational signal corresponding to another current, preferably higher than the true load current and therefore gives the order for earlier introduction of commutation. For this reason series resonance circuits are connected to the network voltage 10, comprising condensers 11 and reactors 12. Parallel with each resonance circuit, a reactor 16 is connected in series with a resistor 15. These reactors 16 constitute the primary windings in a system of transformers 13, whose secondary sides are connected to a rectifier bridge 14. Said series resonance circuits 11, 12 are tuned for the normal frequency of the commutation voltage, in other words, the A.C. network frequency. As long as the commutation voltage is normal therefore the voltage over the resonance filter will be quite small. Upon disturbances in the commutation voltage however a voltage will occur over said series resonance filter, which voltage will be transformed from the reactors 16 over to the secondary side of the transformer system 13 and rectified in the rectifier bridge 14. On the output side of this rectifier bridge a smoothing condenser 17 and a voltage divider 18, 19 have been arranged. Upon disturbances in the commutation voltage therefore a voltage will occur over the resistor 19, which voltage is added to the signal voltage from the device 7, by means of which said deviations in the commutation voltage will be interpreted by the control means as an increase of the converter load current. By a suitable choice of the different components in the device, a suitable additional voltage over the resistor 19 can be obtained and in the same way a suitable acceleration of ignition pulses. In order to limit the current in the reactor 16, this is connected in series with a resistor 15.

On FIG. 1 the series resonance circuits 11, 12 are connected between the network 10 and the device 8 in order to exclude smaller disturbances in the network voltage from the device 8 as previously mentioned. If such a filter thus exists, it may be practical to use this filter for the purpose of the invention as shown.

Further, it can be seen that at disturbances within the disturbance range which the filter is capable of excluding from the device 8 it is unnecessary to let the device according to the invention be active. In order to obtain a threshold value for the signal according to the invention, the diode 20 is used. This has a certain voltage drop in its conducting direction and as long as the voltage from the rectifier 14 is below the sum of this conducting voltage drop and the conducting voltage drop of the rectifier, the voltage over the resistor 19 will be zero. The device according to the invention will first be active when the disturbances in the network voltage are so great that the voltage from the rectifier 14 exceeds said summary conducting voltage drop. Instead of an ordinary diode 20 a zener diode or a uni-junction transistor or the like could be used. Further, the use of the diode 20 is not limited to the cases where the resonance filter 11, 12 is connected to the device 8. As previously mentioned, the device 8 can function satisfactorily also if the commutation voltage deviates to a small degree from sinusoidal form, so that it may always be of value to provide a certain threshold value for the device.

If for some reason a filter is not connected to the device 8, but this device is connected direct to the network 10, the filter 11, 12 can be connected over the resistor to a common neutral point. As can be seen, this will not make any great change in FIG. 1.

In certain cases it may be practical to use a separate filter 11 and 12 for transformer 13 even if a similar filter exists already in order to provide a sinusoidal control function for the device 8. The two parallel series resonance filters are provided, one for the device 8 and one for supplying the transformer 13, which filters can be constructed each in accordance with its function.

Instead of series resonance filters, parallel resonance filters can be used as is evident from FIG. 2, which shows one phase of a parallel resonance filter. This comprises a reactor 12′ parallel connected with a condenser 11′. These two components are connected to one phase of the network 10 and over a resistor 15′ to a neutral point 0. The reactor 16′ which forms a primary winding in transformer 13 is connected over the resistor 15′ and is thus in this case series connected with the resonance filter. The parallel resonance filter is tuned for the network frequency and will therefore at normal voltage block this voltage so that the voltage over the resistor 15′ becomes zero. Upon disturbances however the filter 11′, 12′ will let through possible harmonics, so that the transformer 13 receives voltage and the device according to the invention influences the control function.

FIG. 3 shows a curve I, which shows the relation between the network frequency $f$ and the margin of commutation $\gamma$. As previously mentioned, the margin of commutation will be inversely proportional to the network frequency. An increase in the network frequency will therefore entail a shortening of the margin of commutation in degrees as well as in seconds. Since the de-ionising time of the ionic rectifiers is substantially independent of the frequency, it is therefore desirable to increase the margin of commutation measured in degrees at increasing frequency.

As an example in FIG. 3, the margin of commutation is shown equal to 18° at the normal frequency 50 cycles/sec. A frequency increase to 51 c./s. entails a reduction of the margin of commutation to about 10°, which in this case is regarded as satisfactory. A further reduction of the margin of commutation would however jeopardize the commutation. A further increase in the network frequency must therefore cause a correction and the diode 20 has therefore been adapted so that the voltage from the rectifier 14 upon such an increase is passed to the resistor 19. As previously mentioned, an increase in the frequency must involve an increase in the margin of commutation, which means that the transformer 13 and the resistor 18, 19 must be adapted so that the curve I at increasing frequency is converted to in the dashed curve branch II.

A decrease of the network frequency entails as previously mentioned an increase in the margin of commutation and with the device described here the margin of commutation will increase further at decreasing frequency. The curve I will therefore at decreasing frequency be converted to in the dashed curve branch III. As previously mentioned this is quite unnecessary and therefore the device is provided with a frequency sensitive relay 21 influenced from the network frequency for disconnection of the device when the frequency decreases below a certain value.

It is still better however as shown in FIG. 1 to let the frequency sensitive relay 21 reverse the voltage from the resistor 19 with the help of a two-way contact 22. Even if in principle it may be reasonable to decrease the margin of commutation at decreasing frequency, since the de-ionising time of the rectifiers is independent of the frequency, it can for other reasons be justifiable to reduce the influence according to the invention at falling frequency, and the lowest contact part in the two-way contact 22 has therefore been connected to taps on the resistor 19 instead of to its upper end. The curve I will therefore be converted to in the dashed curve branch IV at decreasing frequency.

In FIG. 3 the interval 49–51 c./s. comprises the frequency interval where the device according to the invention is inactive owing to the influence of the diode 20. Outside this interval the device however will be active and it is seen that according to the invention it is possible to compensate for disturbances in the commutation voltage, so that with a device according to the invention, the margin of commutation control practically can be set corresponding to a normal sinusoidal commutation voltage without reference to possible disturbances.

I claim:

1. A static inverter connecting a direct current network to a multiphase alternating current network and comprising a rectifier connection between said two networks; control means delivering control pulses to the rectifiers of said rectifier connection with a certain delay angle; said control means comprising for each rectifier an input circuit; means to feed to the input circuits a direct current magnitude and means to feed and alternating current magnitude; said feeding means being connected in series to said input circuits; said control means including means to deliver a control pulse to said rectifier when the sums of said two series connected magnitudes attains a pre-determined value; said means to feed a direct current magnitude including a direct current measuring means for measuring the load current of said inverter; said direct current measuring means being common to all the rectifiers; said means to feed an alternating current magnitude including means for deriving alternating voltages proportional to the commutation voltages for the different rectifiers and a phase shifter between said alternating voltage deriving means and said control circuit; characterized by additional means for delivering a direct current magnitude which is added to said first direct current magnitude; said additional means comprising a rectifier connection connected to said alternating current network and including a band block filter; said band block filter being tuned to the rated frequency of said alternating current network.

2. A static inverter as claimed in claim 1, a threshold value means on the output side of said rectifier connection.

3. A static inverter as claimed in claim 1; said rectifier connection comprising a transformer connection the primary side of which is connected to said band block filter; said band block filter comprising an oscillation circuit tuned to the rated frequency of said alternating current netwok.

4. A static inverter as claimed in claim 3; said oscillation circuit comprising a parallel resonance circuit; the primary side of said transformer connection being connected in series with said parallel resonance circuit.

5. A static inverter as claimed in claim 3; said oscillation circuit comprising a series resonance circuit; the primary side of said transformer connection being connected in parallel with said series resonance circuit.

6. A static inverter as claimed in claim 5; the input side of said phase shifter being connected to said alternating current network through said series resonance circuit.

7. A static inverter as claimed in claim 1; a contact connecting the output side of said additional means being connected to the output side of said direct current measuring means; a frequency dependent relay connected to said alternating current network and controlling said contact; said contact being opened when the actual frequency of said alternating current network decreases to a pre-determined value lower than the rated frequency of said alternating current network.

8. A static inverter as claimed in claim 1; a polarity reversal switch connecting the output side of said additional means connected to the output side of said direct current measuring means; a frequency dependent relay connected to said alternating current network and controlling said switch; said switch being operated when the actual frequency of said alternating current network decreases to a pre-determined value lower than the rated frequency of said alternating current network.

References Cited

UNITED STATES PATENTS

| | | | |
|---|---|---|---|
| 2,359,142 | 9/1944 | Murcek | 328—72 |
| 2,775,723 | 12/1956 | Crowther et al. | 315—272 X |
| 2,879,486 | 3/1959 | Grandmont et al. | 307—106 X |
| 2,929,013 | 3/1960 | McNamee | 321—35 |
| 3,099,785 | 7/1963 | Kessler et al. | 321—16 |

JOHN F. COUCH, *Primary Examiner.*

G. GOLDBERG, *Assistant Examiner.*